Aug. 9, 1960

J. F. HOLDERNESS 2,948,283

HOLDER FOR TOBACCO PIPES

Filed Feb. 24, 1958

INVENTOR.
Jack F. Holderness
BY

Aug. 9, 1960   J. F. HOLDERNESS   2,948,283
HOLDER FOR TOBACCO PIPES
Filed Feb. 24, 1958   2 Sheets-Sheet 2
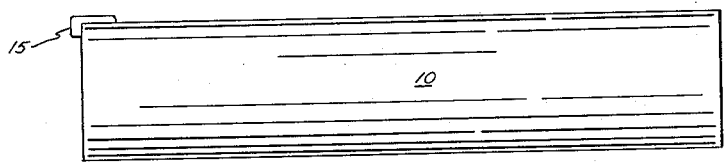
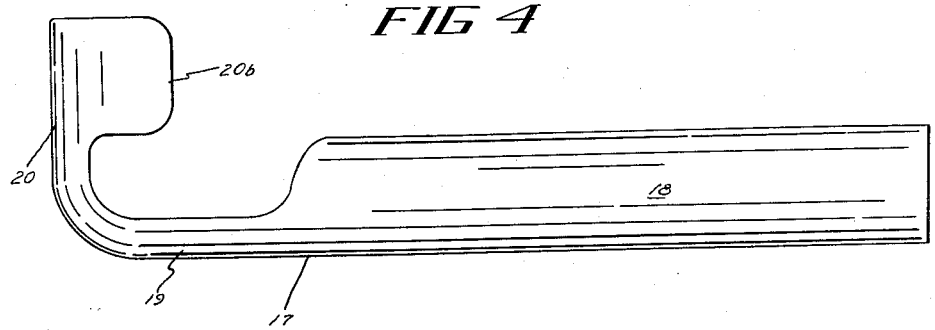
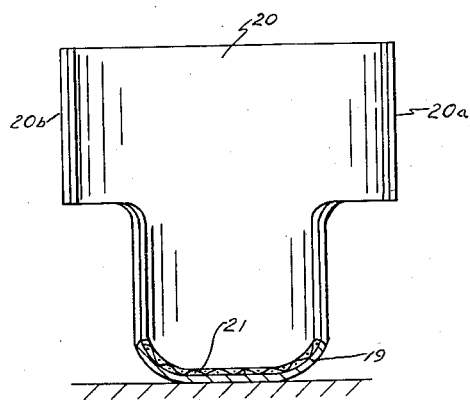
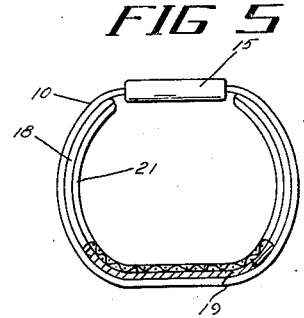
INVENTOR.
Jack F. Holderness

United States Patent Office 2,948,283
Patented Aug. 9, 1960

2,948,283

HOLDER FOR TOBACCO PIPES

Jack F. Holderness, Box 305, Odessa, Wash.

Filed Feb. 24, 1958, Ser. No. 717,054

4 Claims. (Cl. 131—260)

My invention relates to a holder for a tobacco pipe. It is the principal purpose of my invention to provide a holder for a tobacco pipe that is particularly useful in carrying the pipe on the instrument panel of an automobile. Many smokers of pipes have difficulty when they are driving a car in finding a place to put down the pipe safely and conveniently. The customary smoker's accessories provided on automobiles make no provision for anything but ashes so far as the pipe smoker is concerned.

My invention is embodied in a simple two piece unit which can be readily attached to the instrument panel in such a fashion as to support the pipe in an upright position and in safety so that it can be placed in the holder or removed from the holder with one hand and so that it cannot tip over so as to spill burning material or ashes while it is being held in the holder.

It is a further purpose of my invention to provide a pipe holder of this character which is easily fabricated from sheet and tube material at a low cost.

The nature and advantages of my invention will appear more fully from the following description and the accompanying drawings illustrating a preferred form of the invention. It should be understood, however, that the drawings and description are illustrative only and are not intended to limit the invention except insofar as it is limited by the claims.

In the drawings:

Figure 3 is a side view of the mounting sleeve of the pipe holder;

Figure 4 is a side view of the pipe carrying slide of the pipe holder;

Figure 5 is an enlarged sectional view taken substantially on the line 5—5 of Figure 2; and Figure 6 is an enlarged sectional view taken on the line 6—6 of Figure 2.

Figure 1:
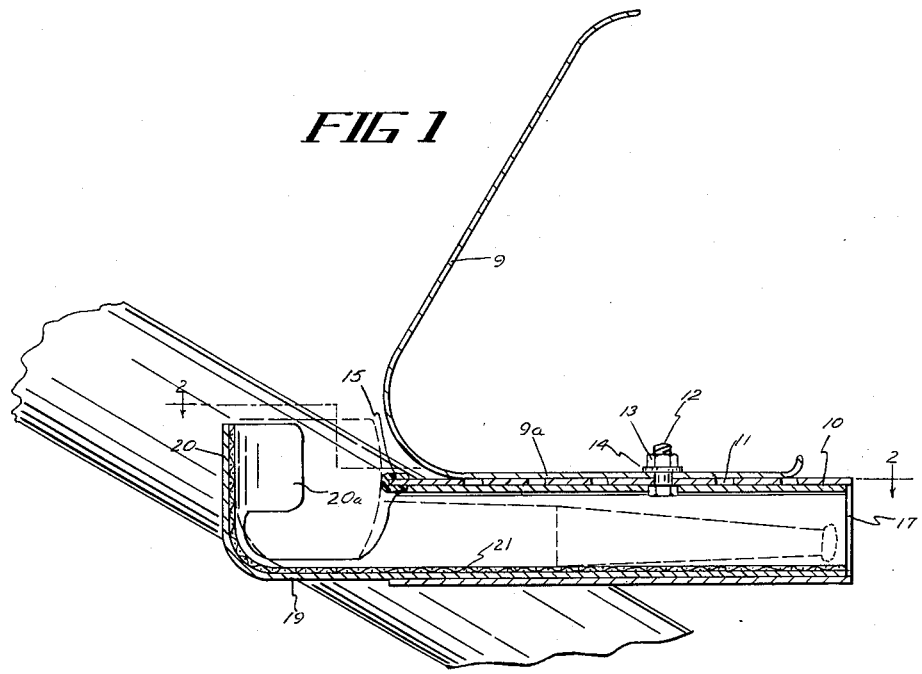
Figure 1 is a sectional view showing a portion of the instrument panel of an automobile with my pipe holder attached thereto.
Figure 2:
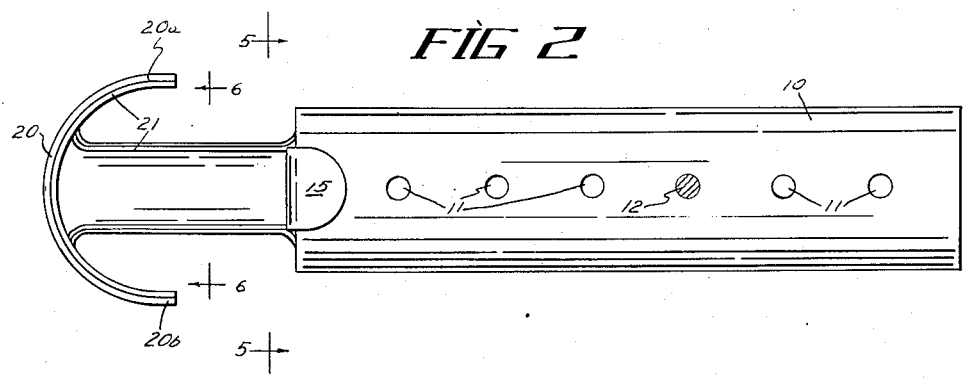
Figure 2 is an enlarged plan sectional view taken substantially on the line 2—2 of Figure 1.

Referring now in detail to the drawings, my smoker's tobacco pipe holder as illustrated, utilizes a mounting sleeve 10 for mounting the pipe holder on the instrument panel 9 of an automobile. The mounting sleeve 10 is a tube which as shown, is non-cylindrical for a reason to be later explained. This tube 10 has a plurality of mounting apertures 11 arranged along the top row to receive short bolts 12 that can be extended through the lower wall 9a of the instrument panel and fastened by a nut 13 and a washer 14 to the instrument panel. The tube 10 is shown as made of metal, but of course, any suitable material can be used for this purpose. At one end of the tube I have provided in line with the apertures 11 a pad 15 of yielding material such as soft plastic or rubber to protect a pipe indicated in dotted lines in Figure 1 against damage by the edge of the tube 10.

A pipe carrying slide 17 includes a long split tubular portion 18 which is formed to fit with a frictional engagement with the interior of the tube 10. The slide 17 is open along the top edge throughout the portion 18 so that it can be withdrawn completely from the tube 10 if desired. The slide is prevented from turning within the tube 10 by any suitable means. Both the tube 10 and the slide 17 are flattened along the bottom. This keeps the slide 17 from turning in the tube 10. It also enables the slide 17 to remain right side up when it is laid on a flat surface. The tube 10 also has a flat top wall. As shown, the heads of the bolts 12 and the pad 15 are within the opening of the top of the portion 18. They also would prevent turning of the slide 17 in the tube 10. At the front end of the slide there is a reduced bottom extension 19 integral with the portion 18. This extension 19 is cut away sufficiently to enable the user of the pipe holder to easily grasp a pipe that is seated in the holder and lift it upwardly out of the slide. The entire length of the slide 17 is preferably made such that a pipe seated in the slide can be lifted out readily when the slide portion 18 has a substantial part thereof within the tube 10. The pipe is held upright in the slide by a front shield 20 which is formed by extending the part 19 upwardly and providing two wings 20a and 20b that are curved to extend toward the portion 18 of the slide 17.

The interior of the slide 17 is preferably so made as to protect the pipe by having a lining 21 throughout. This lining may be of any yielding material that will protect the pipe against injury. The lining illustrated in the drawings is of fabric but it is obvious that other yielding materials may be used to surface the slide 17.

In using my invention, when the tube 10 is mounted on the instrument panel, the user can place his pipe in the slide 17 and insert the slide within the tube 10 where the split portion 18 of the slide will have sufficient frictional engagement with the tube 10 to hold the slide in any adjusted position within the tube. Since the slide must continue to exert a certain pressure against the tube 10, I prefer to make it of a springy material and of sufficient thickness that it will not bend easily. With the slide partially in the tube 10, the user can insert the pipe stem into the slide until the pipe bowl drops behind the shield portion 20 of the slide and then shove the slide into the tube far enough to bring the pipe bowl against the pad 15. If the slide 17 is removed from the tube and set upon a flat surface, its flattened bottom surface will hold it upright.

Having thus described my invention, I claim:

1. A pipe holder adapted for attachment to the instrument panel of an automobile comprising a tube having means to secure it to the instrument panel to extend substantially horizontal, a pipe holder having a mounting portion slidably telescoping with the tube and frictionally held thereby, said portion and said tube having cooperating parts thereon substantially preventing turning of said portion with respect to the tube while they are telescoped, said pipe holder having an upturned end portion spaced from said mounting portion to receive a pipe bowl therebetween, and having a bottom wall extending from the mounting portion and supporting said upturned end portion, the end portion having wings diverging therefrom and curved toward the mounting portion, the tube having an end confronting the wings operable to hold a pipe bowl seated in the holder against the confronting end of the tube when the pipe has its stem extended into said tube.

2. The invention defined in claim 1 wherein the tube has a flat top wall and curved side walls and the mounting portion has an opening along the top thereof beneath and aligned with said flat top wall.

3. The invention defined in claim 1 wherein the tube and the mounting portion have flat bottom walls, the said parts that prevent turning of the mounting portion with respect to the tube including said flat bottom walls.

4. The invention defined in claim 7 wherein the pipe holder has a flat bottom wall, the mounting portion thereof has an opening along its top and the tube has a yielding pad on its end toward the upturned end of the holder, partially received in the opening of the mounting portion and further opposing turning of the mounting portion.

References Cited in the file of this patent

UNITED STATES PATENTS

| | | |
|---|---|---|
| D. 110,885 | Springer et al. | Aug. 16, 1938 |
| 1,627,907 | Jorgensen | May 10, 1927 |
| 1,636,378 | Mallory | July 19, 1927 |
| 2,528,173 | Pinckney | Oct. 31, 1950 |

FOREIGN PATENTS

| | | |
|---|---|---|
| 1,027,200 | France | Feb. 11, 1953 |